3,145,155
HYDROBROMINATION OF ETHYLENE
Charles T. Pumpelly and Bruce W. Wilkinson, Midland, Mich., assignors to The Dow Chemical Company, Midland, Mich., a corporation of Delaware
No Drawing. Filed May 24, 1962, Ser. No. 197,279
3 Claims. (Cl. 204—154)

This invention relates to the hydrobromination of ethylene and it particularly relates to a method for producing pure ethyl bromide by hydrobromination in the presence of high energy ionizing radiation.

This application is a continuation-in-part of our copending application Serial Number 843,942, filed October 2, 1959, now abandoned.

At present ethyl bromide is manufactured by one of two general methods. One of these involves the reaction of hydrogen bromide with ethyl alcohol. Classically this is done in the presence of red phosphorus. The cost of the reactants, the economic disadvantages of using alcohol in a process, and the fact that a constant boiling mixture of alcohol and ethyl bromide is obtained by distillation of the reaction mixture are all drawbacks inherent in this method. The other and more recent of the two methods is the direct addition of hydrogen bromide to ethylene. A number of catalytic systems have been proposed for operation of this process. Some of them are by nature too expensive to operate economically and many require that unusual temperatures and pressures or specialized equipment be used to effect the reaction. To avoid the disadvantages of gas phase reactions, solvents capable of dissolving both reactants have been employed so as to operate in the liquid phase. On the other hand, introduction of a solvent into the process may also introduce new difficulties.

High energy ionizing radiation has been found to be a particularly effective means for initiating the addition of hydrogen bromide to an olefin such as ethylene and this process is advantageously carried out using a solvent-filled reaction zone. By using such a catalyzing influence, it becomes unnecessary to use reactor walls of special transparency or to limit the thickness of the reaction zone as must be done, for example, in a photochemically induced reaction. In this case, however, the powerfully catalytic but non-specific nature of high energy radiation such as X-rays, beta or gamma radiation, and the like also affects to some extent the solvent used as well as the reactants and the product itself. Because such radiation is capable of breaking any chemical bond, many different radicals may therefore be generated by its undiscriminating force and by-products thereby formed make the separation of a pure product more difficult.

It has now been found that hydrogen bromide and ethylene are advantageously reacted in a solvent-filled reaction zone subjected to high energy ionizing radiation and a particularly pure grade of ethyl bromide is obtained when the reaction solvent used is ethyl bromide itself. It has been found that although high energy radiation attacks solvents in general in which this reaction is carried out, thereby causing formation of contaminating by-products by the random recombination of the various fragments or radicals formed, when ethyl bromide is the sole solvent, either it is not so attacked or the radicals which may be formed by such attack must recombine predominantly to reconstitute the original ethyl bromide.

High energy ionizing radiation of at least five or ten thousands rads per hour intensity is suitable and intensities as great as ten million rads per hour may be employed. Preferably, the high energy radiation is utilized at an intensity between about fifty thousand and one million rads per hour. Generally, the reaction mixture is sufficiently catalyzed when it has absorbed a total high energy ionizing radiation dosage between about one thousand and one million rads. By high energy ionizing radiation is meant radiation of the type which provides emitted particles or photons having intrinsic energy of a magnitude which is greater than the planetary electron binding energies that occur in the reacting material. Such radiation is available from various radioactive substances which emit beta or gamma radiation as, for example, radioactive elements including cobalt 60 and cesium 137, nuclear reactor fission products, and the like. If it is preferred or more expedient, however, high energy ionizing radiation from an electron beam generator such as a Van de Graaff accelerator, resonant transformer, a linear accelerator, and X-ray generator, or the like may also be used.

The time required for the accomplishment of the reaction is limited by the period which is necessary for a practical amount of addition of the hydrogen bromide to the ethylene. Ordinarily a retention time of the olefin in the irradiated reaction zone of between about ten minutes and one hour is sufficient. The optimum time depends upon the volume and concentration of the reactants, the radiation intensity employed, and the temperature of the reaction mixture.

The mixture is suitably carried out at a temperature between about $-20°$ C. to about $100°$ C. In order to operate at the preferred atmospheric or near-atmospheric pressure level, a reaction temperature between about $-20°$ C. and about $20°$ C. is most preferred. If desired, the process may be operated under superatmospheric pressure and this becomes necessary at temperatures above the boiling point of ethyl bromide in order to maintain the liquid phase.

The reactants are preferably admitted into the reaction zone in approximately the stoichiometric proportions. It is sometimes desirable to use either reactant in slight excess over the stoichiometric mole per mole ratio. It is ordinarily beneficial to maintain the reactor contents in an agitated state during the hydrobromination in order to effect intimate contact of the hydrogen bromide with the ethylene. However, the sparging or bubbling of the two gaseous reactant streams into the bottom of the ethyl bromide solvent usually provides adequate agitation. Mechanical stirrers may be used advantageously when relatively large reaction zones are involved.

After the ethylene has been hydrobrominated and the ethyl bromide product obtained, the reaction mass by either batchwise or continuous techniques is neutralized with a suitable compound such as anhydrous sodium carbonate or its equivalent, washed thoroughly with water and dried. No distillation is ordinarily required since the washed and dried product is essentialy pure ethyl bromide. Yields are nearly quantitative based on conversion of the starting ethylene.

As is apparent, many varieties of apparatus can be employed in the practice of the present invention. Those adapted to either batchwise or continuous operations may be efficaciously utilized to meet any manufacturing need that may require fulfillment.

Examples 2 and 3 illustrate specific ways in which the present invention may be practiced. Examples 1 and 4 show runs made in carbon tetrachloride for purpose of comparison.

Example 1

About 700 g. of carbon tetrachloride was put in a glass reactor and ethylene and hydrogen bromide gases were simultaneously sparged into the solvent. During the sparging process, the temperature was maintained within a range from about −2° C. to about −6° C. and the reaction zone was subjected to gamma radiation from a cobalt 60 source at an intensity of 250,000 rads per hour. Over a period of time of about 30 minutes, a total of 196 g. of ethylene and hydrogen bromide in nearly stoichiometric quantities were charged into the reactor. About 192 g. of ethyl bromide was formed and separated from the reaction mixture.

*Example 2*

A continuous glass reactor was filled with ethyl bromide and ethylene and hydrogen bromide gases were sparged into the ethyl bromide over a period of about 2 hours. During the sparging process, the temperature was maintained at about −9° C. and the reaction zone was subjected to gamma radiation from a cobalt 60 source at an intensity of about 254,000 rads per hour. Nearly pure ethyl bromide was produced.

Since the experiment using ethyl bromide as a reaction solvent appeared to yield a product superior in quality to that obtained when carbon tetrachloride was employed, these runs were repeated under carefully controlled identical conditions. The products of these parallel runs were then examined for quality. These experiments are described in Examples 3 and 4.

*Example 3*

A 550 ml. glass reactor was filled with pure ethyl bromide and placed in a location where it was subjected to a gamma radiation intensity of 124,000 rads per hour from a cobalt 60 source. Gaseous hydrogen bromide and ethylene were then admitted at the bottom of the reactor through separate spargers, the temperature being maintained at about 1.5° C. An overflow container collected excess ethyl bromide as the reaction proceeded. The gas feed rates were 398 g./hr. of hydrogen bromide and 138 g./hr. of ethylene, essentially the stoichiometric proportions. The reaction was run for approximately 2 hours, at the end of which time a composite sample of the reaction product was taken for vapor phase chromatographic analysis.

*Example 4*

A run was carried out exactly as described in Example 3 with the sole exception that the reactor was filled at the start with carbon tetrachloride. After about two hours of running, a composite sample of the reaction product was taken for vapor phase chromatographic analysis.

Analytical comparison of the products obtained in Examples 3 and 4 revealed that the reaction in ethyl bromide had produced a very pure grade of ethyl bromide containing essentially none of the by-products which might have been expected from radiation-induced breakdown of the primary product and interaction and combination of the various substances known to be or postulated to be present in the reaction zone. On the other hand, the product from Example 4 where carbon tetrachloride was used as a solvent was contaminated with numerous such impurities. While the quantity present of any particular impurity was not excessive, the number and variety of these impurities was such that purification of the product was thereby complicated and made more difficult. In neither of the two products was there any evidence of polymerized ethylene.

Ethyl bromide prepared as shown above but using a reaction solvent other than itself or carbon tetrachloride also shows the presence of contaminating impurities analogous to those found in the product made in carbon tetrachloride solution.

We claim:

1. A process for the production of ethyl bromide which comprises contacting ethylene and hydrogen bromide in a reaction zone filled with liquid ethyl bromide at a temperature from about −20° C. to about 100° C. and in the presence of a field of high energy ionizing radiation of an intensity of between about 5,000 and 10,000,000 rads per hour.

2. The process of claim 1 wherein the reactants are contacted in about equimolecular proportion.

3. A process for the production of ethyl bromide which comprises contacting one mole of ethylene and about one mole of hydrogen bromide in a reaction zone filled with liquid ethyl bromide at a temperature from about −20° C. to about 20° C. and in the presence of a field of high energy ionizing radiation of an intensity of between about 50,000 and 1,000,000 rads per hour and removing ethyl bromide from the reaction mixture in the amount formed.

References Cited in the file of this patent

UNITED STATES PATENTS

| | | |
|---|---|---|
| 2,307,552 | Vaughan et al. | Jan. 5, 1943 |
| 2,398,481 | Vaughan et al. | Apr. 16, 1946 |
| 2,473,162 | McBee et al | June 14, 1949 |
| 2,540,126 | Lacomble et al. | Feb. 6, 1951 |
| 2,540,127 | Lacomble et al. | Feb. 6, 1951 |
| 2,899,370 | Rosenberg | Aug. 11, 1959 |
| 2,925,369 | Grabiel et al. | Feb. 16, 1960 |
| 3,026,257 | Wilkinson et al. | Mar. 20, 1962 |

OTHER REFERENCES

Bourne et al.: "Chem. and Ind.," Nov. 24, 1956, pages 1372–76.

Martin: "Chem. and Eng. News," vol. 33 (April 1955), pages 1424–28.